(12) United States Patent
Ha et al.

(10) Patent No.: US 7,513,125 B2
(45) Date of Patent: Apr. 7, 2009

(54) METHOD FOR CONTROLLING AIR CONDITIONER

(75) Inventors: Do Yong Ha, Anyang-si (KR); Jin Ha Choi, Seoul (KR); Si Kyong Sung, Seoul (KR); Jae Sik Kang, Seoul (KR); Young Min Park, Incheon-si (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 11/204,167

(22) Filed: Aug. 16, 2005

(65) Prior Publication Data

US 2006/0123813 A1      Jun. 15, 2006

(30) Foreign Application Priority Data

Dec. 14, 2004   (KR) .................... 10-2004-0105330

(51) Int. Cl.
 *F25D 17/00* (2006.01)
 *F25B 5/00* (2006.01)
(52) U.S. Cl. ............................... 62/179; 62/199; 62/200
(58) Field of Classification Search ................. 62/179, 62/199, 200, 160, 222, 224, 225
 See application file for complete search history.

(56) References Cited

U.S. PATENT DOCUMENTS 5,050,396 A  *  9/1991  Ohkoshi et al. ............... 62/160

5,531,076 A     7/1996  Pellenz et al.

FOREIGN PATENT DOCUMENTS

| EP | 0 431 491 A1 | 6/1991 |
|---|---|---|
| EP | 0 801 274 A2 | 10/1997 |
| EP | 1 347 248 A1 | 9/2003 |
| GB | 2 268 256 A | 1/1994 |
| JP | 2003056933 A  * | 2/2003 |
| KR | 10-1999-0042257 A | 6/1999 |
| KR | 10-2003-94563 A | 12/2003 |

* cited by examiner

*Primary Examiner*—Chen-Wen Jiang
(74) *Attorney, Agent, or Firm*—Birch, Stewart, Kolasch & Birch, LLP

(57) ABSTRACT

A method for controlling a multi-unit air conditioner is disclosed which is capable of preventing frost from being formed on the outer surface of a refrigerant line. In order to control an air conditioner including an outdoor unit, a plurality of indoor units corresponding to the out door unit, and a plurality of refrigerant lines for connecting the indoor units to the outdoor unit, respectively, the method includes the steps of measuring respective states of the refrigerant lines using a measurement sensor, determining respective states of the refrigerant lines, based on measurement data obtained by the measurement sensor, and controlling an operation state of an operating one or operating ones of the indoor units, in accordance with the determined state of the refrigerant line associated with the operating indoor unit or each operating indoor unit.

18 Claims, 3 Drawing Sheets

METHOD FOR CONTROLLING AIR CONDITIONER

This application claims the benefit of Korean Patent Application No. P2004-105330, filed on Dec. 14, 2004, which is hereby incorporated by reference as if fully set forth herein.

BACKGROUND OF THE INVENTION

1. Field of the Invention

The present invention relates to an air conditioner, and more particularly, to a method for controlling an air conditioner, which is capable of preventing frost from being formed on the outer surface of a refrigerant line connected to an indoor unit.

2. Discussion of the Related Art

Generally, air conditioners are used to cool or heat a confined space such as a room or to clean indoor air, in order to provide a comfortable indoor environment for users. Such an air conditioner includes a refrigeration system including a compressor, a condenser, an expansion valve, and an evaporator.

Air conditioners are mainly classified into a separation type and an integrated type. In an integrated type air conditioner, indoor and outdoor units thereof are integrated. Such an integrated type air conditioner is directly installed on an outer wall or window of a house. In a separation type air conditioner, an indoor unit, in which a cooling/heat-radiating device is installed, and an outdoor unit, in which heat-radiating/cooling and compressing devices are installed, are separated from each other, and are connected to each other via a refrigerant line.

Separation type air conditioners are also classified into a general type wherein one indoor unit is connected to one outdoor unit, and a multi-unit type wherein a plurality of indoor units are connected to one outdoor unit.

Also, in accordance with structures and operation methods of cooling systems thereof, multi-unit air conditioners are classified into a switching type wherein all indoor units operate in the same operating mode, that is, in cooling mode or heating mode alone, and a simultaneous type wherein a part of the indoor units operate in cooling mode, and the remaining indoor unit or indoor units operate in heating mode.

Recently, simultaneous type air conditioners have been mainly developed because they can provide both the cooling and heating effects to provide a more comfortable indoor environment without being influenced by ambient temperature or environment.

Meanwhile, in conventional air conditioners, a decrease in the suction pressure of a compressor occurs when a cooling operation is continuously performed for a prolonged period of time. Such a decrease in the suction pressure of the compressor results in a decrease in the surface temperature of the refrigerant line which connects the indoor and outdoor units. As a result, moisture (vapor) contained in ambient air is condensed on the outer surface of the refrigerant line, and is then accumulated in the form of frost on the outer surface of the refrigerant line in accordance with a further decrease in the surface temperature of the refrigerant line. Such a phenomenon is called "frosting".

When such frosting occurs on the outer surface of the refrigerant line, the heat exchange of the refrigerant with ambient air is inefficiently carried out. As a result, the frosting of the outer surface of the refrigerant line may become severe.

In order to melt the frost accumulated on the outer surface of the refrigerant line in the above-mentioned conventional air conditioners, a method for stopping indoor units, which are in operation, has been used. In accordance with this method, when a refrigerant line is maintained at sub-zero temperatures for a predetermined time or more, an indoor unit associated with the refrigerant line is stopped. The stopped indoor unit is operated again when the surface temperature of the refrigerant line increases to a predetermined temperature or more after passage of a certain time.

However, this method has a problem in that the indoor unit does not operate during the process for melting the frost accumulated on the outer surface of the refrigerant line, so that it is impossible to supply comfortable air to the user in the room in which the indoor unit is installed.

Since the above-mentioned method is adapted to simply melt the frost already accumulated on the outer surface of the refrigerant line, there is also a problem in that the temperature of air discharged to the room may be too low to supply comfortable air to the user, even before the stopping of the indoor unit.

Furthermore, the frost accumulated on the outer surface of the refrigerant line degrades the heat exchanging capability of the air conditioner, so that the air conditioner exhibits a degraded heat exchanging efficiency.

SUMMARY OF THE INVENTION

Accordingly, the present invention is directed to a method for controlling an air conditioner that substantially obviates one or more problems due to limitations and disadvantages of the related art.

An object of the present invention is to provide a method for controlling an air conditioner, which is capable of supplying comfortable air to the user.

Another object of the present invention is to provide a method for controlling an air conditioner, which is capable of preventing frost from being formed on an outer surface of a refrigerant line.

Another object of the present invention is to provide a method for controlling an air conditioner, which is capable of rapidly melting frost accumulated on an outer surface of a refrigerant line.

Still another object of the present invention is to provide a method for controlling an air conditioner, which is capable of achieving an enhancement in heat exchanging efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an air conditioner including an outdoor unit, a plurality of indoor units corresponding to the out door unit, and a plurality of refrigerant lines for connecting the indoor units to the outdoor unit, respectively, comprises the steps of: measuring respective states of the refrigerant lines using a measurement sensor; determining respective states of the refrigerant lines, based on measurement data obtained by the measurement sensor; and controlling an operation state of an operating one or operating ones of the indoor units, in accordance with the determined state of the refrigerant line associated with the operating indoor unit or each operating indoor unit.

The indoor unit operation state controlling step may comprise the step of controlling an RPM of a blowing fan installed in the operating indoor unit or each operating indoor unit in accordance with the determined state of the refrigerant line associated with the operating indoor unit or each operating indoor unit.

The refrigerant line state measuring step may comprise the step of measuring respective surface temperatures of the refrigerant lines using temperature sensors.

The refrigerant line state determining step may comprise the steps of discriminating, as a first indoor unit, the indoor unit associated with the refrigerant line or each refrigerant line, the surface temperature of which is not higher than a predetermined reference temperature, and discriminating, as a second indoor unit, the indoor unit associated with the refrigerant line or each refrigerant line, the surface temperature of which is higher than the predetermined reference temperature.

The reference temperature may be higher than 0° C.

The indoor unit operation state controlling step may comprise the step of increasing the RPM of the blowing fan installed in the first indoor unit for a first predetermined time.

The indoor unit operation state controlling step may further comprise the step of returning the RPM of the blowing fan installed in the first indoor unit to a normal value when the surface temperature of the refrigerant line associated with the first indoor unit is not lower than a first predetermined temperature after passage of the first predetermined time.

The indoor unit operation state controlling step may further comprise the step of increasing the RPM of the blowing fan installed in the second indoor unit when the surface temperature of the refrigerant line associated with the first indoor unit is lower than the first predetermined temperature after passage of the first predetermined time.

The indoor unit operation state controlling step may further comprise the step of returning the RPM of the blowing fan installed in the second indoor unit to a normal value when the surface temperature of the refrigerant line associated with the first indoor unit is not lower than a second predetermined temperature during an operation of the second blowing fan.

The first predetermined temperature and the second predetermined temperature may be different from each other. Preferably, the first predetermined temperature is higher than the second predetermined temperature. Alternately, The first predetermined temperature and the second predetermined temperature may be equal. The first predetermined temperature and the second predetermined temperature may be higher than the reference temperature.

The step of returning the RPM of the blowing fan associated with the first indoor unit to the normal value and the step of returning the RPM of the blowing fan associated with the second indoor unit to the normal value may be simultaneously executed.

In another aspect of the present invention, a method for controlling an air conditioner including an outdoor unit, a plurality of indoor units corresponding to the out door unit, and a plurality of refrigerant lines for connecting the indoor units to the outdoor unit, respectively, comprises the steps of: measuring a suction pressure of a compressor included in the outdoor unit and respective surface temperatures of the refrigerant line using measurement sensors arranged desired positions in the air conditioner; determining respective states of the refrigerant lines, based on measurement data obtained in accordance with the measurement by the measurement sensor; and controlling an RPM of a blowing fan installed in an operating one or each operating one of the indoor units, in accordance with the determined state of the refrigerant line associated with the operating indoor unit or each operating indoor unit.

The blowing fan RPM controlling step may comprise the step of increasing the RPM of the blowing fan when the suction pressure of the compressor is not higher than a predetermined reference pressure or when the surface temperature of the refrigerant line is not higher than a predetermined reference temperature.

The blowing fan RPM controlling step may comprise the steps of discriminating, as a first indoor unit, the indoor unit associated with the refrigerant line or each refrigerant line, the surface temperature of which is not higher than the predetermined reference temperature, and discriminating, as a second indoor unit, the indoor unit associated with the refrigerant line or each refrigerant line, the surface temperature of which is higher than the predetermined reference temperature, and increasing the RPM of the blowing fan installed in the first indoor unit, and increasing the RPM of the blowing fan installed in the second indoor unit.

The step of increasing the RPM of the blowing fan installed in the second indoor unit may be executed when the surface temperature of the refrigerant line associated with the first indoor unit is lower than a first predetermined temperature after execution of the step of increasing the RPM of the blowing fan installed in the first indoor unit for a first predetermined time.

The step of increasing the RPM of the blowing fan installed in the second indoor unit may be repeatedly executed until the surface temperature of the refrigerant line associated with the first indoor unit is not lower than a second predetermined temperature.

The blowing fan RPM controlling step may further comprise the step of simultaneously returning the RPM of the blowing fan installed in the first indoor unit and the RPM of the blowing fan installed in the second indoor unit to respective normal values when the surface temperature of the refrigerant line associated with the first indoor unit is not lower than a second predetermined temperature.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a configuration of an air conditioner, to which the present invention is applied, and a method for controlling the air conditioner, in particular, indoor units included in the air conditioner, will be described in detail with reference to FIGS. 1 to 3.

Figure 1:
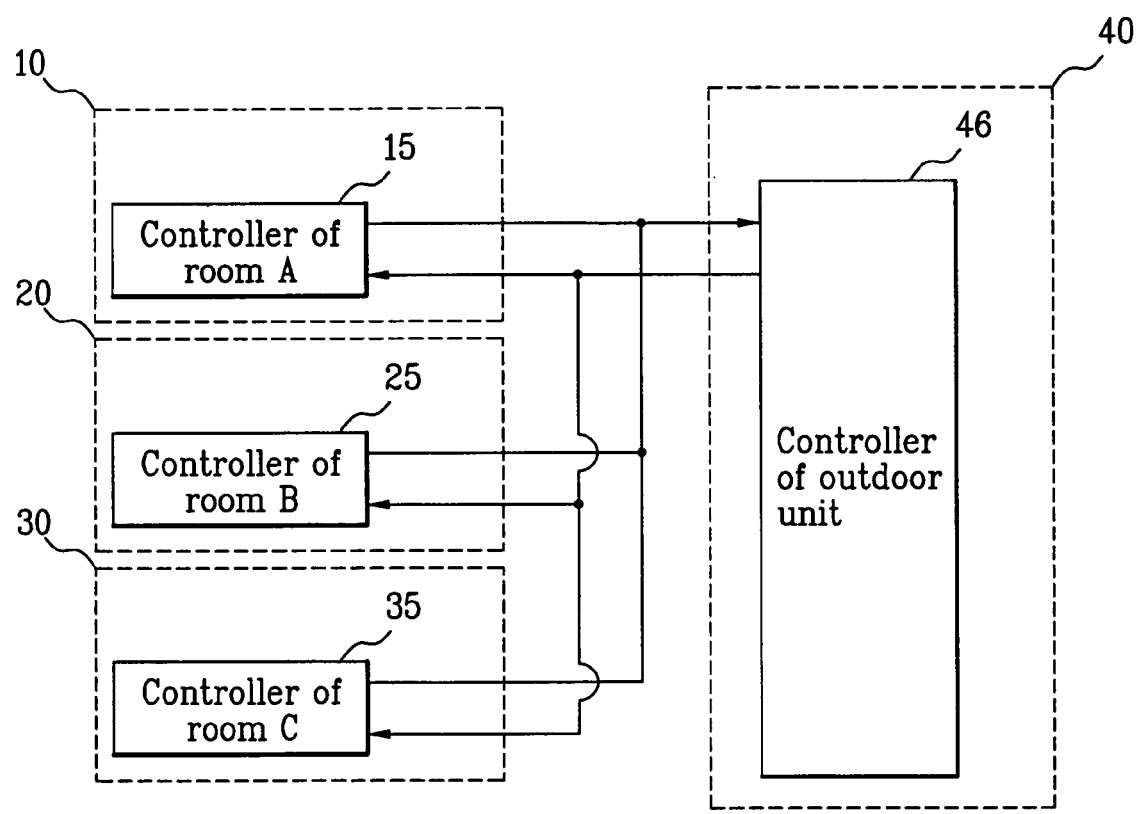
FIG. 1 is a block diagram illustrating a control configuration of an air conditioner to which the present invention is applied.
Figure 2:
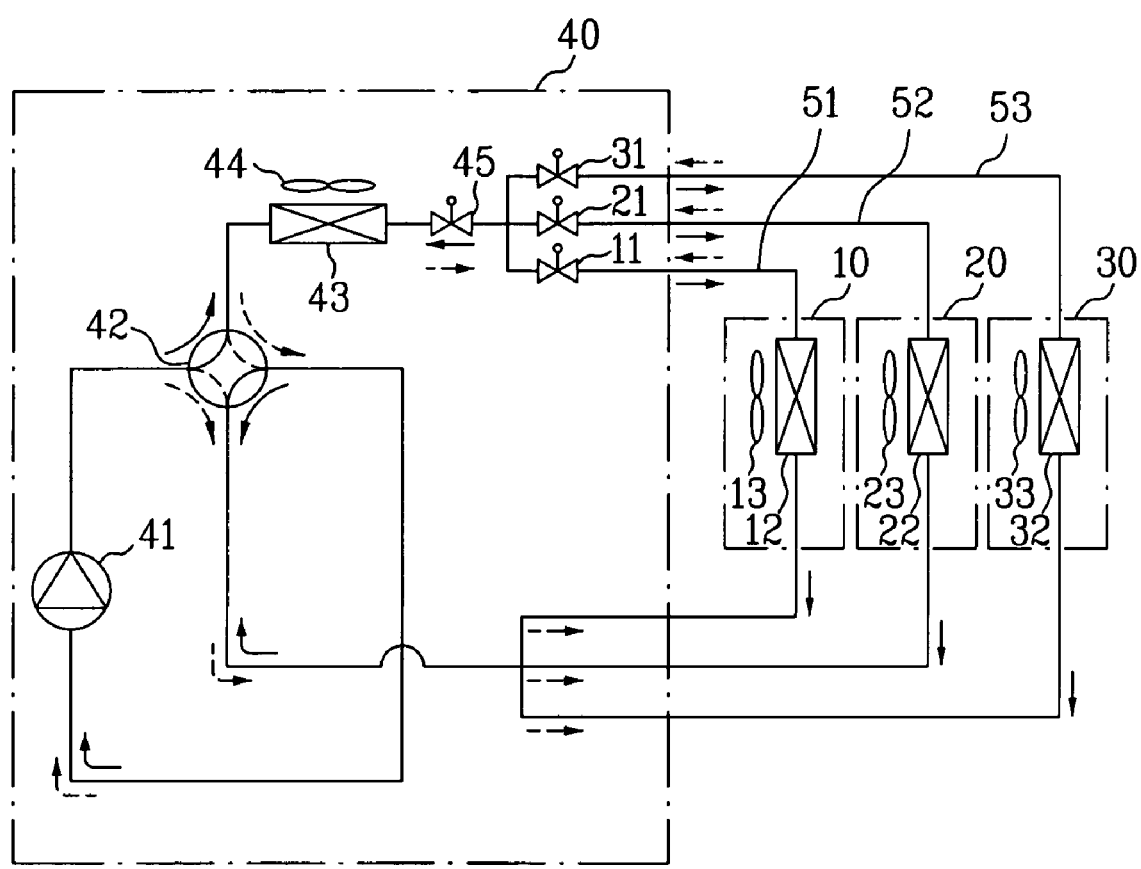
FIG. 2 is a schematic view illustrating a configuration of the air conditioner.

As shown in FIGS. 1 and 2, the air conditioner includes an outdoor unit 40 installed outdoors, and a plurality of indoor units installed in indoors, and at least one refrigerant line for connecting the indoor units to the outdoor unit 40.

In the case illustrated in FIG. 1, the indoor units include an indoor unit 10 for a room A, an indoor unit 20 for a room B, and an indoor unit 30 for a room C. As shown in FIG. 2, the indoor units 10, 20, and 30 are connected to the outdoor unit 40 via a room-A refrigerant line 51, a room-B refrigerant line 52, and a room-C refrigerant line 53, respectively. The indoor units may operate in the same operating mode, that is, in cooling mode or heating mode alone. Alternatively, a part of the indoor units may operate in cooling mode, whereas the remaining part of the indoor units may operate in heating mode.

Controllers 15, 25, and 35 are arranged in respective indoor units 10, 20, and 30, in order to control the associated indoor units 10, 20, and 30, respectively. In detail, the controller 15 is installed in the room A. The room-A controller 15 is connected to an outdoor unit controller 46 in series.

Similarly, the controller 25 is installed in the room B, and is connected to the outdoor unit controller 46 in series. Also, the controller 35 is installed in the room C, and is connected to the outdoor unit controller 46 in series. The room-A controller 15, room-B controller 25, and room-C controller 35 are also connected in parallel. Accordingly, the rooms A, B, and C can be independently controlled.

As shown in FIG. 2, the outdoor unit 40 includes a compressor 41 for compressing a refrigerant to a high-temperature and high-pressure gas state. The compressor 41 is connected to a 4-way valve 42 adapted to change the path of the gas refrigerant compressed to a high-temperature and high-pressure state. The 4-way valve 42 changes the path of the refrigerant in accordance with the operation condition (cooling mode or heating mode) of the air conditioner.

The 4-way valve 42 is connected to an outdoor heat exchanger 43 adapted to condense the high-temperature and high-pressure compressed gas refrigerant to a low-temperature and high-pressure liquid state. An outdoor fan 44 is arranged around the outdoor heat exchanger 43, in order to enable the outdoor heat exchanger 43 to perform effective heat exchange with air. The outdoor fan 44 sucks outdoor air, and blows the sucked air toward the outdoor heat exchanger 43, in order to enable the blown air to heat-exchange with the refrigerant passing through the outdoor heat exchanger 43, thereby inducing phase change of the refrigerant.

The outdoor heat exchanger 43 is connected to a main electronic expansion valve 45 adapted to control the overheating degree of the refrigerant during the cooling operation. Of course, the main electronic expansion valve 45 controls the over-cooling degree of the refrigerant during the heating operation.

Sub electronic expansion valves 11, 21, and 31 are connected to the main electronic expansion valve 45. The sub electronic expansion valves 11, 21 and 31 perform distribution of the refrigerant and guide flow of the refrigerant, in order to selectively cool or heat the associated rooms in accordance with the operation conditions of the associated indoor units 10, 20, and 30, respectively.

Together with the main electronic expansion valve 45, the sub electronic expansion valves 11, 21, and 31 are controlled by a controller (not shown) included in the air conditioner, to reduce the pressure of the low-temperature and low pressure liquid refrigerant cooled and condensed in the outdoor heat exchanger 43, thereby expanding the refrigerant to a low-temperature and low-pressure state.

Indoor heat exchangers 12, 22, and 32 are arranged in respective indoor units 10, 20, and 30. Each of the indoor heat exchangers 12, 22, and 32 evaporates the low-temperature and low-pressure refrigerant emerging from an associated one of the sub electronic expansion valves 11, 21, and 31, thereby changing the refrigerant to a low-temperature and low-pressure gas state. Indoor fans 13, 23, and 33 are also arranged in respective indoor units 10, 20, and 30, in order to circulate indoor air around the indoor heat exchangers 12, 22, and 32, thereby enabling the indoor heat exchangers 12, 22, and 32 to effectively perform heat exchange, respectively.

When the indoor units 10, 20, and 30 operate in cooling mode in the air conditioner having the above-described configuration, a refrigerant cycle is established in which the refrigerant flows along the path as indicated by solid arrows in FIG. 2.

This will be described in more detail. First, the high-temperature and high-pressure gas refrigerant discharged from the compressor 41 of the outdoor unit 40 is introduced into the outdoor heat exchanger 43 through the 4-way valve 42. The refrigerant introduced to the outdoor heat exchanger 43 heat-exchanges with air blown to the outdoor heat exchanger 43 by the outdoor fan 44, so that the refrigerant is condensed to a low-temperature and high-pressure liquid state.

The condensed low-temperature and high-pressure liquid refrigerant from the outdoor heat exchanger 43 is introduced into the sub electronic expansion valves 11, 21, and 31 via the main electronic expansion valve 45. Each of the sub electronic expansion valves 11, 21, and 31 distributes the refrigerant to the associated indoor unit 10, 20, or 30 when the associated indoor unit 10, 20, or 30 operates, and cuts off the refrigerant distributed to the associated indoor unit 10, 20, or 30 when the associated indoor unit 10, 20, or 30 does not operate.

The refrigerant is expanded to a low-temperature and low-pressure state while passing through the sub electronic expansion valves 11, 21, and 31, and is then introduced into the indoor heat exchangers 12, 22, and 32 respectively arranged in the indoor units 10, 20, and 30.

The refrigerant introduced into the indoor heat exchangers 12, 22, and 32 heat-exchanges with indoor air circulated around the indoor heat exchangers 12, 22, and 32 by the indoor fans 13, 23, and 33. In each of the indoor heat exchangers 12, 22, and 32, the pressure-reduced low-temperature and low-pressure refrigerant absorbs heat from the indoor air while being evaporated, thereby cooling the indoor air.

The low-temperature and low-pressure refrigerant gas evaporated in the indoor heat exchangers 12, 22, and 32 is introduced again into the compressor 41, and is then changed to a high-temperature and high-pressure refrigerant gas state by the compressor 41.

Meanwhile, when the indoor units 10, 20, and 30 operate in heating mode, a refrigerant cycle is established in which the refrigerant flows along the path as indicated by dotted-line arrows in FIG. 2.

In this case, first, the high-temperature and high-pressure refrigerant gas discharged from the compressor 41 of the outdoor unit 40 is introduced into the indoor heat exchangers 12, 22, and 32 of the indoor units 10, 20, and 30 through the 4-way valve 42. The refrigerant introduced into each of the indoor heat exchangers 12, 22, and 32 heat exchanges with air blown by the associated indoor fan 13, 23, or 33. That is, the high-temperature and high-pressure gas refrigerant heat-exchanges with ambient-temperature indoor air, so that the refrigerant is cooled to an ambient-temperature and high-pressure liquid state. At this time, the ambient-temperature indoor air is heated to a high-temperature state.

The refrigerant liquefied in each of the indoor heat exchangers 12, 22, and 32 is introduced into the associated sub electronic expansion valve 11, 21, or 31 connected to the heat exchanger 12, 22 or 32. As in the cooling operation, each of the sub electronic expansion valves 11, 21, and 31 distributes the refrigerant to the associated indoor unit 10, 20, or 30 when the associated indoor unit 10, 20, or 30 operates, and cuts off the refrigerant distributed to the associated indoor unit 10, 20, or 30 when the associated indoor unit 10, 20, or 30 does not operate.

The low-temperature and low-pressure refrigerant, which emerges from the main electronic expansion valve 45 after passing through the sub electronic expansion valves 11, 21, and 31, is introduced into the outdoor heat exchanger 43. The refrigerant introduced in the outdoor heat exchanger 43 heat-exchanges with outdoor air blown to the outdoor heat exchanger 43 by the outdoor fan 44.

The low-temperature and low-pressure gas refrigerant cooled in the outdoor heat exchanger 43 is introduced again into the compressor via the 4-way valve 42, and is then changed to a high-temperature and high-pressure refrigerant gas by the compressor 41.

The operation of the air conditioner having the above-described configuration is controlled through control signal communication between the outdoor unit controller 46 installed in the outdoor unit 40 and the room-A, B, and C controllers 15, 25, and 35 respectively installed in the indoor units 10, 20, and 30. Preferably, each of the controllers comprises a microcomputer.

That is, when an operation key on an operating panel (not shown) installed in the room-A indoor unit 10 is pressed, the room-A controller 15 receives an operation signal from the operating panel, and performs a control operation for drivers (for example, an indoor fan driver, a blowing direction driver, an indoor temperature sensor, an indoor conduit temperature sensor, and the like) required in the room-A indoor unit 10, in accordance with the operation signal.

The room-A controller 15 also outputs a communication control signal to the outdoor unit controller 46, so as to enable the outdoor unit controller 46 to perform a control operation for the compressor 41, 4-way valve 42, outdoor fan 44, main electronic expansion valve 45, and the like in accordance with the communication control signal.

The control operations carried out by the room-B and room-C indoor units 20 and 30 are identical to the above-described control operation carried out by the room-A indoor unit 10. The operations of the room-A, room-B, and room-C indoor units 10, 20, and 30 may be independently carried out, or may be carried out in the same mode. For example, the room-A indoor unit 10 may operate in heating mode, whereas the room-B and room-C indoor units 20 and 3D may operate in cooling mode.

Meanwhile, refrigerant lines 51, 52, and 53 are arranged between respective electronic expansion valves 11, 21, and 31 and respective indoor units 10, 20, and 30. Each of the refrigerant lines 51, 52, and 53 functions to connect the associated indoor unit 10, 20, or 30 and the outdoor unit 40, and provides a passage through which the refrigerant flows.

The air conditioner also includes a measurement sensor (not shown) adapted to sense the states of the refrigerant lines 51, 52, and 53. The measurement sensor (not shown) comprises temperature sensors respectively arranged at desired portions of the refrigerant lines 51, 52, and 53, and adapted to measure the surface temperatures of the refrigerant lines 51, 52, and 53. Each temperature sensor is coupled to the controller (not shown) of the air conditioner. Based on measurement data sent from each temperature sensor, the controller (not shown) of the air conditioner controls the RPM of an associated one of the indoor fans 13, 23, and 33 respectively installed in the indoor units 10, 20, and 30.

Of course, a pressure sensor may be used for the measurement sensor. In this case, the pressure sensor is arranged at a desired portion of the compressor 41. The pressure sensor measures the suction pressure of the compressor 41, and is coupled to the controller (not shown) of the air conditioner. In this case, the controller of the air conditioner controls the RPMs of the indoor fans 13, 23, and 33 installed in the indoor units 10, 20, and 30, based on measurement data sent from the pressure sensor. Both the temperature sensors and the pressure sensor may be provided to measure the states of the refrigerant lines.

The controller of the air conditioner checks the states of the refrigerant lines 51, 52, and 53, based on the measurement data sent from the temperature sensors and/or the pressure sensor. The state of each refrigerant line is determined based on the surface temperature of the refrigerant line or the suction pressure of the compressor 41.

An air conditioner control method according to the present invention, in which the indoor fans installed in the indoor units are controlled in accordance with respective states of the refrigerant lines, will be described in detail with reference to FIG. 3.

Figure 3:
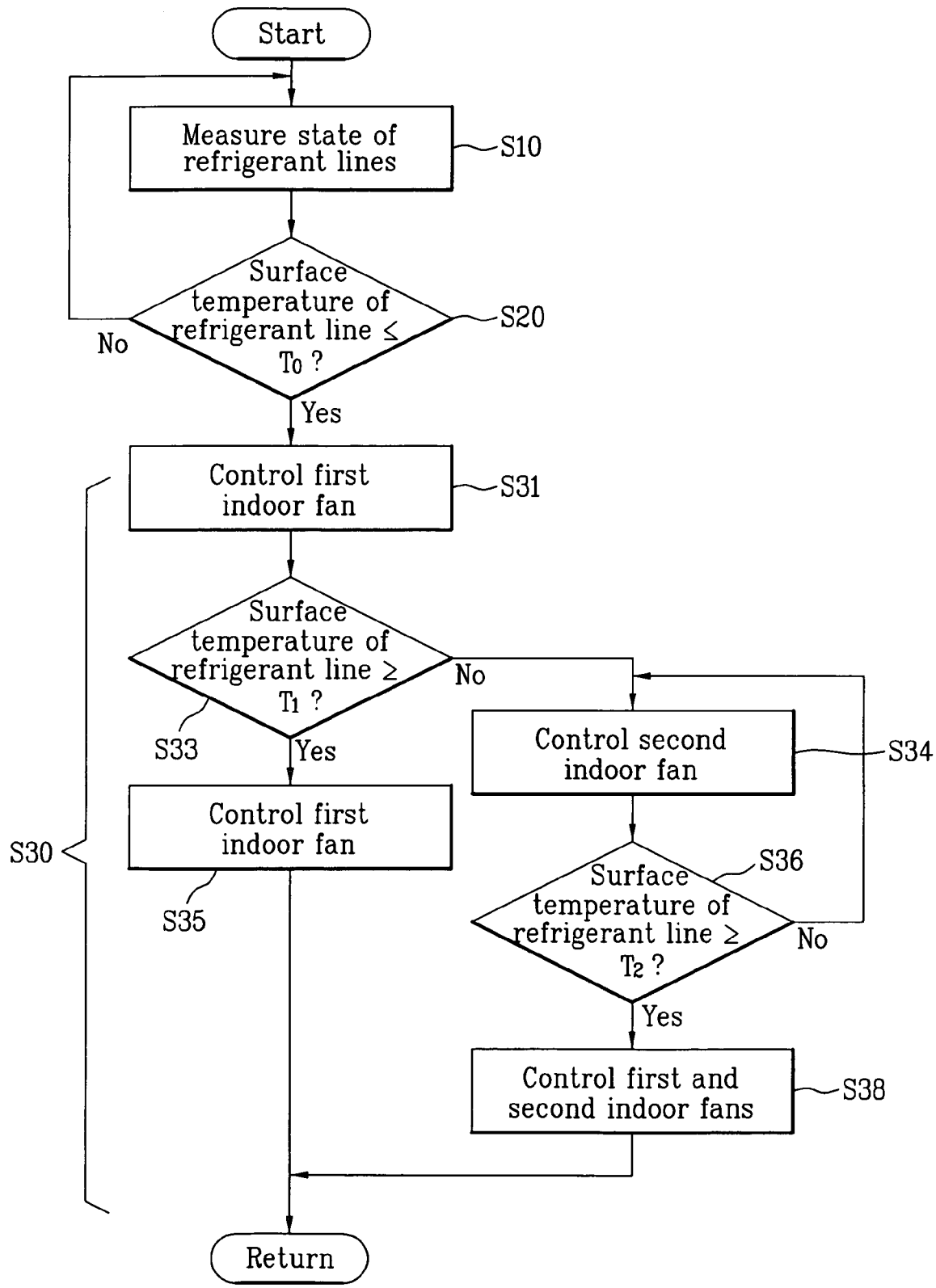
FIG. 3 is a flow chart illustrating a method for controlling the air conditioner in accordance with an embodiment of the present invention.

As shown in FIG. 3, the air conditioner control method according to the present invention includes the steps of measuring respective states of the refrigerant lines using the measurement sensor (S10), determining respective states of the refrigerant lines, based on measurement data obtained by the measurement sensor (S20), and controlling an operation state of the indoor unit or each indoor unit, which is in operation, in accordance with the determined state of the refrigerant line associated with the indoor unit or each indoor unit (S30).

At the refrigerant line state measuring step S10, the controller of the air conditioner measures the surface temperature of each refrigerant line using the temperature sensor arranged at the outer surface of the refrigerant line. Of course, the controller of the air conditioner may measure the suction pressure of the compressor using the pressure sensor arranged at a desired portion of the compressor. When the measured compressor suction pressure is not higher than a predetermined reference pressure P0, the controller of the air conditioner controls the indoor fan associated with the indoor unit or each indoor unit, which is in operation, such that the RPM of the indoor fan is increased, thereby causing the state of the associated refrigerant line to reach a state desired by the user.

The present invention may implement the measurement of refrigerant line states using both the pressure sensor and the temperature sensors, without being limited to the above-described embodiment. In this case, when the state of the air conditioner corresponds to any one of the conditions in which the suction pressure of the compressor is not higher than the predetermined reference pressure P1 and in which the surface temperature of the refrigerant line associated with the indoor unit or each indoor unit, which is in operation, is not higher than a predetermined reference temperature T0, the RPM of the indoor fan associated with the refrigerant line is increased to cause the surface temperature of the refrigerant line to reach a temperature desired by the user.

At the refrigerant line state determining step S20, the controller of the air conditioner discriminates, as a first indoor unit, the indoor unit associated with the refrigerant line or each refrigerant line, the surface temperature of which is not higher than the predetermined reference temperature T0, and discriminates, as a second indoor unit, the indoor unit associated with the refrigerant line or each refrigerant line, the surface temperature of which is higher than the predetermined reference temperature T0. For simplicity, the following description will be given only in conjunction with one first indoor unit and one second indoor unit.

It is preferred that the reference temperature T0 be higher than 0° C. This is because the freezing point of moisture contained in air is 0° C. under the atmospheric pressure, and so, the moisture contained in air is freezable on the outer surface of the refrigerant line when the surface temperature of the refrigerant line is not higher than 0° C.

In accordance with the present invention, however, the reference temperature may be appropriately selected by the user without being limited to the above-mentioned embodiment. For example, the reference temperature T0 may be 0° C. Also, it is preferred that the reference pressure P1 for the compressor correspond to the reference temperature T0 for the refrigerant lines. Of course, the reference pressure P1 for the compressor need not correspond to the reference temperature T0 for the refrigerant lines.

At the indoor unit operation state controlling step S30, the controller of the air conditioner controls the RPM of the indoor fan installed in each of the first and second indoor units, in accordance with the state of the associated refrigerant line. In detail, for the first indoor unit associated with the refrigerant line, the surface temperature of which is not higher than the predetermined reference temperature T0, the controller of the air conditioner controls the indoor fan installed in the first indoor unit (referred to as a "first indoor fan") such that the RPM of the first indoor fan is increased for a first predetermined time M1 (S31). When the surface temperature of the refrigerant line associated with the first indoor unit (referred to as a "first refrigerant line") is not lower than a first predetermined temperature T1 after passage of the first predetermined time M1, the controller of the air conditioner controls the first indoor fan such that the RPM of the first indoor fan returns to a normal value (S33 and S35).

The first predetermined time M1 may be appropriately determined by the user. It is preferred that the first predetermined time M1 be determined, taking into consideration the capacity of the evaporator, the capacity of the compressor, the rated RPM of each indoor fan, the volume of each room to be air-conditioned, and the like. The first predetermined temperature T1 may also be appropriately determined by the user. It is preferred that the first predetermined temperature T1 be determined, taking into consideration the heat transfer rate of the refrigerant, the freezing point of the refrigerant, the freezing point of moisture contained in ambient air, the capacity of the compressor, the capacity of the evaporator, the rated RPM of each indoor fan, and the like.

On the other hand, when the surface temperature of the first refrigerant line lower than the first predetermined temperature T1 after passage of the first predetermined time M1, the controller of the air conditioner controls the indoor fan installed in the second indoor unit (referred to as a "second indoor fan") such that the RPM of the second indoor fan is increased (S34). When the surface temperature of the first refrigerant line associated with the first indoor unit is not lower than a second predetermined temperature T2 in accordance with the operation of the second indoor fan, the controller of the air conditioner controls the first and second indoor fans such that the RPM of each of the first and second indoor fans returns to a normal level (S36 and S38).

The operation time of the second indoor fan may be predetermined by the user. Accordingly, when the surface temperature of the first refrigerant line is lower than the first predetermined temperature T1 after passage of the first predetermined time M1, the controller of the air conditioner controls the second indoor fan such that the RPM of the second indoor fan is increased for the second predetermined time.

On the other hand, when the surface temperature of the first refrigerant line is lower than the second predetermined temperature T2 after passage of the second predetermined time, the second indoor fan is re-operated. The RPM of the second indoor fan during the re-operation thereof may be set to be different from the RPM of the second indoor fan during the initial operation thereof.

Similarly to the first predetermined temperature T1, it is preferred that the first predetermined temperature T2 be determined, taking into consideration the heat transfer rate of the refrigerant, the freezing point of the refrigerant, the freezing point of moisture contained in ambient air, the capacity of the compressor, the capacity of the evaporator, the rated RPM of each indoor fan, and the like.

The first and second predetermined temperatures T1 and T2 are set to be different from each other. In detail, it is preferred that the first predetermined temperature T1 be higher than the second predetermined temperature T2. When the RPM increase of the second indoor fan is additionally carried out, an additional increase in power consumption occurs correspondingly. Meanwhile, if the surface temperature of the first refrigerant line is not lower than the second predetermined temperature, but lower than the first predetermined temperature, this surface temperature can easily reach the first predetermined temperature by increasing only the RPM of the first indoor fan. Accordingly, it is preferred that the first predetermined temperature T1 be higher than the second predetermined temperature T2.

Of course, the first predetermined temperature T1 may be equal to the second predetermined temperature T2. Also, the first and second predetermined temperatures T1 and T2 may be set to be higher than the reference temperature T0. Alternatively, the first predetermined temperature T1, second predetermined temperature T2, and reference temperature T0 may be equal.

In this case, the time for which the RPM increase of the first indoor fan is carried out, and the time for which the RPM increase of the first indoor fan is carried out are appropriately determined. In this case, when the surface temperature of the first refrigerant line reaches a temperature desired by the user, the RPMs of the first and second indoor fans are simultaneously returned to normal values thereof, respectively.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the air conditioner control method provides various effects.

First, in accordance with the present invention, it is possible to prevent frost from being accumulated on the outer surfaces of refrigerant lines by discriminating indoor units, on which frost is accumulated, based on a predetermined reference temperature, and increasing the RPM of a blowing fan installed in each of the discriminated indoor units.

Second, it is possible to rapidly melt frost accumulated on the outer surfaces of refrigerant lines by increasing the RPM of a blowing fan installed in an indoor unit other than the indoor units associated with the refrigerant lines.

Third, it is possible to continuously supply comfortable air to the user by controlling an indoor unit connected to a refrigerant line, on which frost is accumulated, such that the indoor unit is not stopped.

Fourth, it is possible to achieve an enhancement in the thermal efficiency of the air conditioner in accordance with the prevention of accumulation of frost on the refrigerant lines.

What is claimed is:

1. A method for controlling an air conditioner including an outdoor unit, a plurality of indoor units corresponding to the outdoor unit, and a plurality of refrigerant lines for connecting the indoor units to the outdoor unit, the method comprising:

measuring respective states of the refrigerant lines using a measurement sensor;

determining if a measured respective state of a first refrigerant line of the refrigerant lines is lower than a first predetermined value causing frost to be formed on an outer surface of the first refrigerant line; and increasing a blowing speed of a first indoor fan associated with a first indoor unit of the plurality of indoor units connected to the first refrigerant line when the determined measured respective state of the first refrigerant line is lower than the first predetermined value.

2. The method of claim 1, wherein the increasing step increases the blowing speed for a predetermined amount of time.

3. The method of claim 1, wherein the measuring step comprises measuring at least one of respective surface temperatures of the refrigerant lines using temperature sensors and a suction pressure of a compressor connected to the refrigerant lines using a suction pressure sensor.

4. The method of claim 1, further comprising:

determining if the measured respective state of the first refrigerant line is greater than a second predetermined value that is greater than the first predetermined value, after the step of increasing the blowing speed of the first indoor fan.

5. The method of claim 4, further comprising:

decreasing the blowing speed of the first indoor fan associated with the first indoor unit when the determined measured respective state of the first refrigerant line is greater than the second predetermined value.

6. The method of claim 4, further comprising:

increasing a blowing speed of a second indoor fan associated with a second indoor unit of the plurality of indoor units connected to a second refrigerant line when the determined measured respective state of the first refrigerant line is not greater than the second predetermined value.

7. The method of claim 6, further comprising:

determining if the measured respective state of the first refrigerant line is greater than a third predetermined value that is between than the first and second predetermined values, after the step of increasing the blowing speed of the second indoor fan.

8. The method of claim 7, further comprising:

continuing the increase of the blowing speed of the second indoor fan associated with the second indoor unit connected to the second refrigerant line when the determined measured respective state of the first refrigerant line is not greater than the second predetermined values.

9. The method of claim 8, further comprising:

returning the blowing speed of the first and second indoor fans to a previous speed when the determined measured respective state of the first refrigerant line is greater than the third predetermined value.

10. An air conditioning system, comprising:

an outdoor unit;

a plurality of indoor units corresponding to the outdoor unit;

a plurality of refrigerant lines configured to connect the indoor units to the outdoor unit; and a controller configured to measure respective states of the refrigerant lines using a measurement sensor, to determine if a measured respective state of a first refrigerant line of the refrigerant lines is lower than a first predetermined value causing frost to be formed on an outer surface of the first refrigerant line, and to increasing a blowing speed of a first indoor fan associated with a first indoor unit of the plurality of indoor units connected to the first refrigerant line when the determined measured respective state of the first refrigerant line is lower than the first predetermined value.

11. The system of claim 10, wherein the controller increases the blowing speed for a predetermined amount of time.

12. The system of claim 10, wherein the controller measures at least one of respective surface temperatures of the refrigerant lines using temperature sensors and a suction pressure of a compressor connected to the refrigerant lines using a suction pressure sensor.

13. The system of claim 10, wherein the controller is further configured to determine if the measured respective state of the first refrigerant line is greater than a second predetermined value that is greater than the first predetermined value, after the step of increasing the blowing speed of the first indoor fan.

14. The system of claim 13, wherein the controller is further configured to decrease the blowing speed of the first indoor fan associated with the first indoor unit when the determined measured respective state of the first refrigerant line is greater than the second predetermined value.

15. The system of claim 13, wherein the controller is further configured to increase a blowing speed of a second indoor fan associated with a second indoor unit of the plurality of indoor units connected to a second refrigerant line when the determined measured respective state of the first refrigerant line is not greater than the second predetermined value.

16. The system of claim 15, wherein the controller is further configured to determine if the measured respective state of the first refrigerant line is greater than a third predetermined value that is between than the first and second predetermined values, after the step of increasing the blowing speed of the second indoor fan.

17. The system of claim 16, wherein the controller is further configured to continue the increase of the blowing speed of the second indoor fan associated with the second indoor unit connected to the second refrigerant line when the determined measured respective state of the first refrigerant line is not greater than the second predetermined values.

18. The system of claim 17, wherein the controller is further configured to return the blowing speed of the first and second indoor fans to a previous speed when the determined measured respective state of the first refrigerant line is greater than the third predetermined value.

* * * * *